April 29, 1958 J. W. BEATTY 2,832,507
DISPENSING APPARATUS
Filed June 5, 1953 4 Sheets-Sheet 1

INVENTOR.
JOHN W. BEATTY
BY Jerome P. Bloom
and Wade Koontz
ATTORNEYS

April 29, 1958  J. W. BEATTY  2,832,507
DISPENSING APPARATUS
Filed June 5, 1953  4 Sheets-Sheet 2
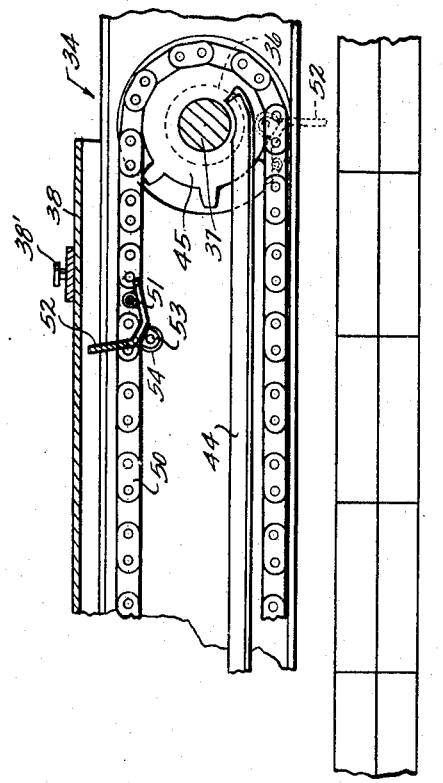
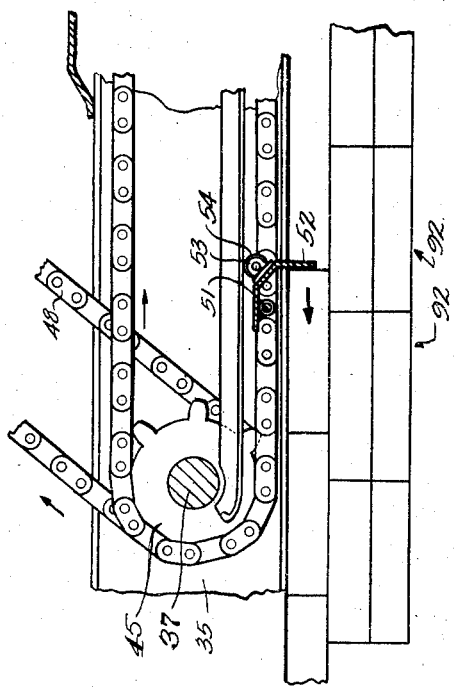
Fig 2
INVENTOR.
JOHN W. BEATTY
BY Jerome P. Bloom
Wade Krouty
ATTORNEYS

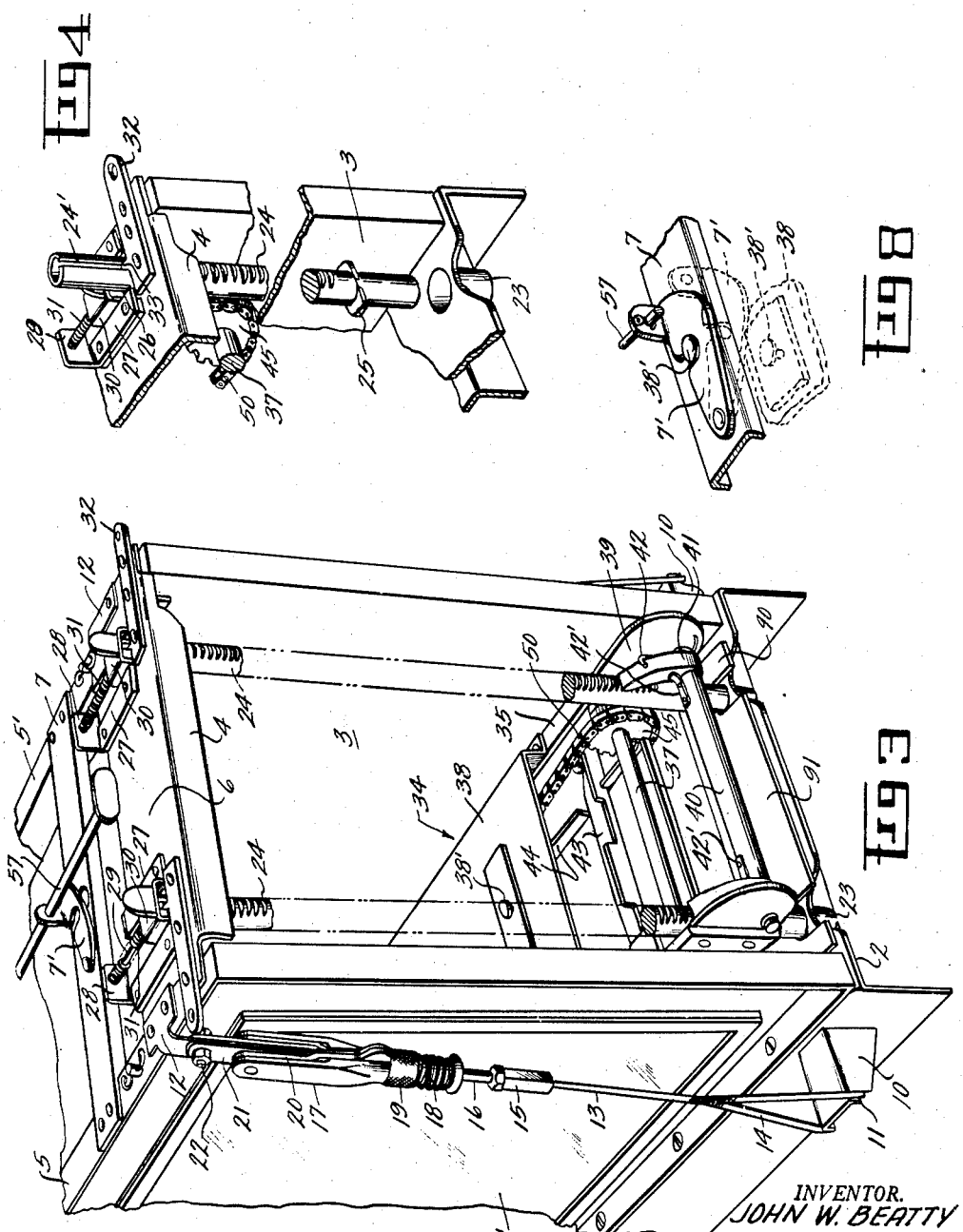

April 29, 1958
J. W. BEATTY
2,832,507
DISPENSING APPARATUS
Filed June 5, 1953
4 Sheets-Sheet 4
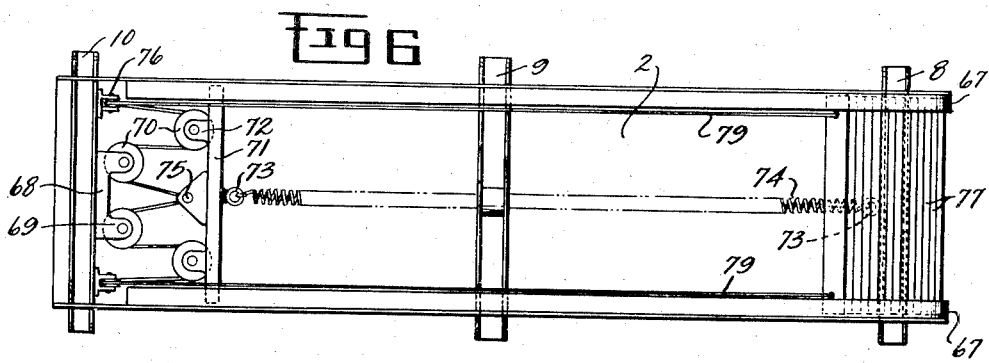
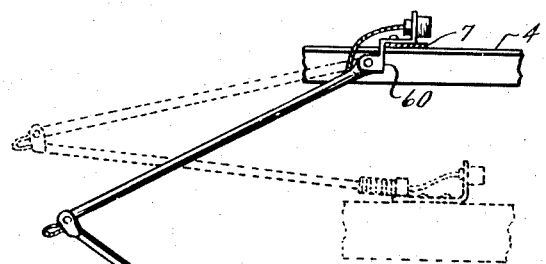
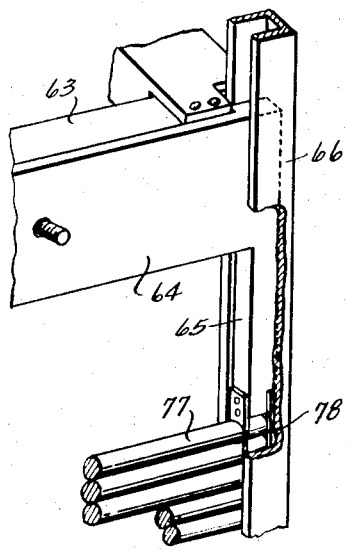
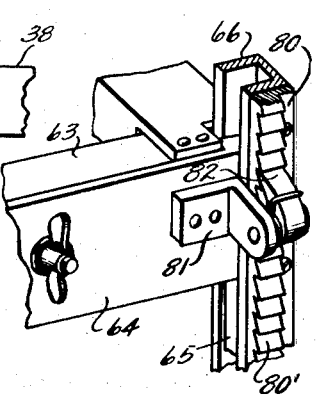
INVENTOR.
JOHN W. BEATTY
BY Jerome P. Bloom
and
Wade Koontz
ATTORNEYS United States Patent Office 2,832,507
Patented Apr. 29, 1958

2,832,507

DISPENSING APPARATUS

John W. Beatty, Dayton, Ohio

Application June 5, 1953, Serial No. 359,977

4 Claims. (Cl. 221—112)

(Granted under Title 35, U. S. Code (1952), sec. 266)

The invention described herein may be manufactured and used by or for the Government for governmental purposes without payment to me of any royalty thereon.

This invention is directed to a novel and improved type of apparatus for dispensing packaged articles and a correspondingly improved method of dispensing. While the preferred embodiment of the invention as described herein is directed in application to the dispensing of pre-packaged "chaff" from an aircraft, the apparatus and method of the invention may be directed to various types of packaged articles. The novel structure of the invention presents a highly simplified and compact dispensing feed unit which effects an increased capacity to the dispenser housing, permits a considerable cost economy in fabrication and presents a positive feed dispensing action to effect a continuous dispensing of packaged materials with a minimum of maintenance problems.

An object of the invention is to provide a new and novel dispensing apparatus for use in vehicles subject to centrifugal and acceleration forces.

A further object of the invention is to provide an improved, low cost, compact dispensing feed unit.

An additional object of the invention is to provide an improved method of dispensing pre-packaged articles.

Another object of the invention is to provide a new and novel dispensing apparatus including an improved spring assisted, gravity controlled feed unit.

Other objects and advantages of the invention will be readily apparent to those versed in the art from the following description taken in conjunction with the accompanying drawings wherein:

Fig. 2 is a cross sectional side view of the improved dispenser unit showing the feeding arrangement.

Fig. 3 is a fragmentary perspective view of the assembled dispensing apparatus showing the rear portion details.

Fig. 4 is a fragmentary rear view of the assembled dispensing apparatus of Fig. 3 showing how the ratchet rods may be removed.

Fig. 5 is a fragmentary front view showing the connection between the feed unit and the guard grid.

Fig. 6 is a bottom view of the assembled apparatus.

Fig. 7 is a partial sectional view of the dispensing apparatus showing the power connection between the housing and the dispenser feed unit.

Fig. 8 shows the detail of the safety lock to retain the feed unit in raised position in the housing.

Fig. 9 shows a modification of the invention.

Figure 1:
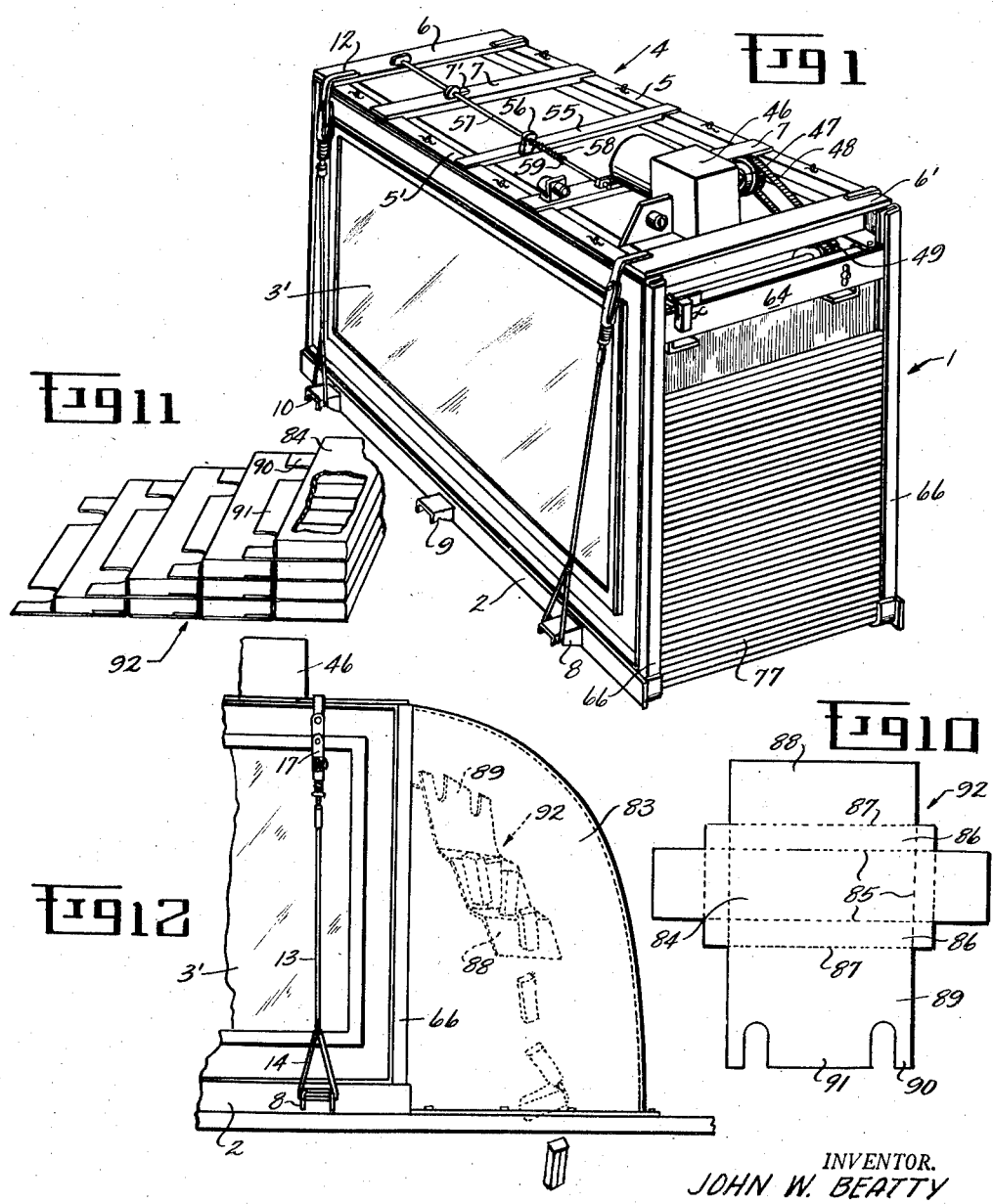
Fig. 1 is a perspective view of the novel dispensing apparatus.

Fig. 10 discloses a package cover such as is employed in the invention.

Fig. 11 shows a group of covered packages in assembled relation as employed in the novel dispensing apparatus.

Fig. 12 is a partial side view of the improved dispensing apparatus showing a package being opened in the process of being dispensed.

The apparatus which forms the novel structure of the invention is capable of easy assembly and comprises a housing 1 which consists of a bottom panel 2, two side panels 3 and 3' and an upper frame cover 4 providing a front and a rear opening in the housing. The upper frame cover 4 is composed of two right angle cross-section side elements 5 and 5' connected at their respective ends by plates 6 and 6' and also transversely thereof intermediate their ends by plates 7. One side panel 3 is a solid panel which is flanged outwardly about its perimeter for cooperative engagement with the outwardly extending flange of the side element 5 of the upper frame cover 4. The side panel 3' is formed similarly to panel 3 except that there is a plastic window inserted centrally thereof which window may be arranged in a frame as shown in Fig. 1 of the drawings and the frame secured to the panel 3' about an opening therein. The frame may be secured in any suitable manner, such as by screws. While the panels 3 and 3' have been shown as dissimilar, they may be both composed of solid panels as panel 3 or both have windows for visual inspection. The upper extending flange of panel 3' is cooperatively secured to the side element 5' by fasteners. The bottom panel 2 is secured to the outwardly extending flanges on the side panels at the bottom thereof. The bottom panel 2 has depending flanges at the sides thereof which flanges are apertured in opposite relation in spaced portions thereof. Fixed to the bottom surface of panel 2 and transversely thereof with the ends extending through opposed apertures in the flanges are bracket members 8, 9, and 10. The bracket member ends are each apertured and have depending hook portions 11. Connected to the frame cover end plates 6 and 6' are depending strap elements 12. Connecting means are provided between strap elements 12 and the brackets 8 and 10, including a rod 13 with a triangular hook portion 14 at one end and a threaded female connector element 15 at the other end which is threadedly engaged by a male connector rod 16 which has a bifurcated end 17, the neck portion of the bifurcation being encircled by a coil spring 18 interposed between a flange at one end of the neck and an adjustable collar 19. Pivoted at the bifurcated end of element 17 and within said bifurcation is another bifurcated element 20 composed of two offset plates pinned together, the pinned end including a projection at one side thereof. Parallel arranged link members 21 are pivoted to elements 20, within the bifurcated portion. These connecting assemblies interconnect the bracket members 8 and 10 respectively with the strap elements 12, the triangular hook portion 14 of each assembly engaging the depending hook 11 on a bracket and a bolt 22 connecting the strap 12 arranged intermediate the parallel link members 21 to such link members as shown in the drawings. By the connecting assemblies as indicated the housing is held together in properly secured and tensioned relation, the male, female connection providing an adjusting means to establish the proper securing of the elements of the housing together to resist the effects of vibration.

In the rear end of the bottom panel 2 are apertures having tubular guides 23 depending therefrom. Seated in the tubular guides are the lower extremities of tubular ratchet rods 24 having projections 25 thereon adapted to abut the bottom panel and limit downward movement therein. One side of each rod is provided with an extended series of ratchet teeth and each rod is uniformly slotted at 24' at the upper end thereof. The upper ends of the ratchet rods which are arranged parallel to each other extend through the frame cover 4 at the rear end thereof through slots 26 in the plate 6'. Parallel guide members 27 are connected to plate 6' adjacent the slots and spaced from plate 6' to provide guide channels therewith. In line with the ways formed by the respective pairs of guide members 27 are upstanding lug members 28 connected to the rear edge of plate 6'. The lugs 28 are similarly apertured to provide a bearing for rods 29 extending therethrough which are connected at their other ends to open ended flanged cap member 30 whose flanges bear in the guide channels formed by their respective guide members 27. A coil spring 31 surrounds each rod, abutting a lug 28 and the rear end of a cap member 30 respectively to resiliently bias the cap member over the respective slot in the plate 6'. Secured to the rear edges of plate 6' are strap members 32 which have projections 33 slightly smaller than the slots in the ratchet rods extending into the ends of the respective slots in the plate 6' to engage in the slots 24' in the upper ends of the ratchet rods to maintain their predetermined position with their ratchet teeth turned rearwardly. The cap members are biased by the springs 31 over the upper ends of the ratchet rods to maintain them in locked position and restrain their vertical movement.

Mounted within the housing is a dispenser feed unit 34 composed of a pair of U-shaped side frames 35 having transversely aligned projecting pockets at the respective ends thereof for bearings 36 which rotatably support sprocket rods 37. A cover 38 having outwardly projecting flanges is secured to the upper legs of the U-shaped side frames 35, bridging the gap therebetween. Rearward extensions 39 are secured to the respective side frames 35 as by rivets and a reinforcing rod 40 connects the rearward extensions 39.

The reinforcing rod 40 serves to mount spaced dog members 41 thereon. The dog members are spaced on the connecting rod 40 to align with the ratchet rods 24 and engage cooperatively with the ratchet teeth on the rods and such members 41 are rotatably mounted on rod 40. A coil spring 42 is wrapped around each end of rod 40 and each spring is respectively connected to an extension 39 at one end and a dog member 41 at the other end to resiliently and continuously bias the dog member 41 into engagement with the ratchet teeth. Leaf springs 42' connected to rod 40 and bearing against the inner sides of the dog members hold them in alignment with the ratchet teeth. The ratchet teeth are so formed to permit downward movement of the dog members on the ratchet rods but not upward movement. Accordingly as can be readily seen the dispenser unit 34 when the dog members 41 engage the ratchet teeth can only move downwardly of the housing unless the dog members are disengaged from the ratchet teeth.

The ratchet rods 24 and ratchet engaging dog members 41 are extremely important in the environment for which this dispensing apparatus is to be used. This is because when this dispensing apparatus is mounted in a rapidly moving plane or other vehicle, changes in direction and speed could cause the dispensing feed mechanism to be lifted off the layer of packaged articles to be dispensed. This possibility has been eliminated by the above mentioned ratchet rod and dog member structure. The ratchet rods have an additional function. They are spaced close enough together so that after the dispensing apparatus is loaded with packaged articles to be dispensed and after these ratchet rods are in place, they prevent the packaged articles from falling out of the container through that open end of the housing due to vibrations or changes in direction or speed. Reinforcing elements 43 connect the side frames 35 and a longitudinally extending bearing plate 44 is secured to the under surfaces of the respective reinforcing elements 43 and the bearing plate has curved bearing portions at each end for the respective sprocket rods 37. Connected to each sprocket rod are two sprocket wheels 45 spaced inwardly from the side frames 35 and longitudinally aligned. Mounted on the forward end of the dispenser unit cover 38 is a motor 46 which may be either electric or hydraulic, whichever may be more convenient. A drive shaft extends from the motor and has a sprocket wheel 47 mounted thereon. A continuous sprocket chain 48 extends from the wheel 47 through an opening in the cover and around a sprocket wheel 49 on the forward sprocket rod 37 intermediate the rod bearing and the sprocket wheel 45 adjacent the side frame but spaced inwardly therefrom. Additional continuous sprocket chains 50 connect the longitudinally aligned sprocket wheels 45. Accordingly the motor 46 furnishes driving power to the wheel 49 through the sprocket chain 48, which wheel 49 turns the forward sprocket rod 37 and the attached sprocket wheels 45 to drive continuous sprocket chains 50. Connected transversely to the continuous chains 50 at diametrically opposed points are connecting rods 51 having dog members 52 attached. To one side of the dog members 52 in brackets 53 thereon are rotatably mounted rollers 54, which as the chain movement brings the dog units under the bearing plate 44 bear against the bottom of the bearing plate while keeping the dog portion in substantially vertical depending position.

Pivotally connected to the plates 7 adjacent apertures in each plate as shown in Fig. 3 of the drawings are hook members 7', the hooked portions thereof being adapted to engage under the heads of stud elements 38' connected to the upper cover 38 of the dispenser feed unit. The respective stud members are arranged to be normally in alignment with the respective apertures in each plate 7. A strap member 55 connected transversely of the upper frame cover 4 has a bearing lug 56 upstanding therefrom with an aperture therein providing a bearing for a spring biased rod 57 connected to the hook members 7'. A coil spring 58 surrounding the rod abuts the bearing lug and a collar 59 fixed to the rod to resiliently bias the hook members into engagement with the stud members where the feed unit is in raised position with the stud members extending through the apertures in the plate 7. The main object of the hook engagement is to secure the dispenser feed unit in raised position in the housing to permit loading and to protect the feed unit from damage while not in use. The safety hook members 7' may be engaged and disengaged by manual operation of the rod 57 as can be readily seen from the drawings.

Connecting a bracket 60 on a plate 7 on the frame cover 4 and a bracket 61 on dispenser unit cover 38 is a jointed tubular connecting means 62. This tubular connecting means 62 provides a housing for power lines to maintain a continuous operative power source from the motor 46 in any vertical position of the dispenser feed unit. Extending forwardly from the dispenser feed unit and spaced therefrom is a bracket unit 63 to which is fixed at the front face a plate 64 having depending lugs 65 at the end portions and in the plane thereof. Connected to the front flanges on the housing are U-shaped guide elements 66 extending vertically thereof on either side of the housing front opening. A continuous strip 67 U-shaped in cross-section is connected to the inner side of each depending flange on the bottom panel 2 and spaced from the bottom surface of the panel. The strips 67 have forward ends which curve upwardly at the front and such strips provide a continuation of the U-shaped guide channels 66 so as to extend them under the bottom panel of the housing.

Connected to the forward side of the rear bracket 10 in the bottom panel of the housing is a bracket 68 at the central portion of bracket 10. The bracket 68 has two pairs of spaced aligned apertured lugs 69 with a pulley wheel 70 rotatably mounted on a pin mounted in the apertures in each pair of lugs respectively. A pulley bracket 71 in the plane of bracket 68 extending transversely of the bottom panel has its ends respectively mounted in the guide channels formed at the under surface of the bottom panel of the housing between the U-shaped strips 67 and the bottom panel 2 for sliding movement longitudinally of the bottom panel. Rearwardly of the bracket and in the plane thereof are spaced pairs of lugs 72 similar to lugs 69 with pulley wheels 70 mounted therein; the spacing of lugs 72 is such that the pulley wheels 70 mounted therein are disposed outwardly relative to the pulley wheels 70 mounted in bracket 68. Welded to the rear of pulley bracket 71 and in the plane thereof is an eye member 73. Similarly welded to the rear of the forward bracket 8 in alignment with the first eye member is an additional eye member 73. Interconnecting the eye members 73 is a coil tensioning spring 74 extending through a tubular channel in the center bracket 9, the spring tending to pull the pulley bracket 71 forwardly in the channel immediately below the bottom panel. Opposed to the eye member 73 at the other side of the pulley bracket 71 is a vertical pin 75. Mounted on the forward face of rear bracket 10 are pulley brackets 76 with pulley wheels 70 mounted therein for rotation in planes perpendicular to the plane of brackets 68 and 71. These latter pulley wheels as is readily apparent from the drawings are spaced outwardly of the other pulley wheels.

A series of interconnected spacer bars 77 interconnected at their respective ends by chain members 78 are rotatably mounted in the forward guide channels 66 on the front end or dispensing side of the housing. These spacer bars 77 have three functions. They retain the layers of packaged articles in the housing; they engage the ends of the packaged articles and space them properly in the housing so they can be engaged by feed elements 52 in the dispenser feed unit; and since they engage and position the ends of the layers of packaged articles in the housing, their rotational mounting in guide channels 66, permits them to roll over the ends of the packaged articles with a minimum of frictional resistance. The connecting chains are connected to the depending lugs on plate 64 in the guide channels 66 which lugs are spacer elements to space the uppermost bar 77 from the end plate on the dispenser unit sufficient to permit ejection of a package through the opening so formed. Cables 79 connect the lowermost spacer bar with the vertical pin 75 in the slidable pulley bracket 71. The cables 79 extend from the respective ends of the lowermost spacer bar over the vertical outward pulleys 70 and under to the pulley wheels 70 on the pulley bracket 71 and then around the pulley wheels on bracket 68 to meet on the vertical pin 75. In this manner the coil tensioning spring 74 continuously tends to bias the pulley bracket 71 forwardly applying tension to cables 79, the lowermost spacer bar 77 and the chains interconnecting the spacer bars, and resultingly to the dispenser feed unit through plate 64.

A starter unit may be connected to the motor in any suitable manner and will not be discussed in detail since it forms no part of the invention proper.

The operation of the dispenser assembly is as follows: The packaged articles may be stacked longitudinally of the housing and in layers. While the housing is loaded, the feed unit 34 is locked in raised position by the hook members 7' engaging the stud members 38' on the feed unit. The height of the layers in the housing will determine the height of the dispenser feed unit 34 which is gravity controlled and spring assisted in its feeding operation by the coil tensioning spring 74. The dispenser feed unit is set with a dog member 52 at the end of a row of packaged articles bearing against the end package in the row to the rear of the housing. The lower flanges on the side frames 35 of the dispenser feed unit rest on the upper surfaces of the upper layer of stacked articles. The dispensing side of the housing has an opening in line with the upper layer of packaged articles formed as previously pointed out by the spacer lugs on plate 64 of the dispenser unit which are connected to the spacer bars 77. At the rear of the housing the dispenser feed unit 34 with its connected dogs 41 engages the ratchet rods teeth, preventing upward movement of the dispenser unit. Actuation of the motor 46 will cause the movement of the sprocket chains 50 with the connected dog members 52. The dog member 52 at the rear of the upper row of packaged articles pushes them out of the dispensing opening one at a time into an ejection chute 83. As the last package in the row is ejected the dispenser unit will drop to the next layer, the other dog member 52 engaging the rear of the end package on the next layer. The dropping of the dispenser feed unit is assisted by the tensioning spring 74 which biases it downwardly through the cable connection to the chains connected to the plate 64 connected to the dispenser unit. In this manner successive layers of articles in the dispensing housing will be ejected.

Fig. 9 shows a modification of the invention. On the dispensing side of the apparatus, fixed to the front leg of each U-shaped guide means 66 is a ratchet bar 80 having teeth 80' extending therefrom. Brackets 81 are fixed to plate 64 and have outwardly extending apertured arms. Rotatably mounted on a pin fixed in the aperture in each arm is a spring biased dog member 82 similar to dog members 41. The teeth 80' are so arranged that they prevent upward movement of the dog members 82 but permit downward movement thereof. Accordingly this modification increases the safety factor by additional means preventing upward movement of the feed unit relative to the housing, insuring positive feed action at all times.

The practical embodiment of the invention as shown herein is applied to the dispensing of pre-packaged "chaff" from an aircraft. The pre-packaged "chaff" is wrapped in individual sleeve units or cartons for automatic separation therefrom on dispensing. The sleeve units as shown in Fig. 10 of the drawings are each composed of a central elongated rectangular shaped panel section 84 perforated at 85 for folding. To either side of the panel section 84 are rectangular side panel sections 86 of reduced width and length perforated for folding at 85 and 87. Connected to one section 86 and extending therefrom is a rectangular panel section 88 of further reduced length and increased width. To the other panel section 86 are connected a panel 89 of a length equal to panel section 88 with its respective width extended by three projecting strips, two end strips 90 relatively narrow in character and a center strip 91 relatively wide with respect to strips 90 providing spaced notches in panel 89. In use the sleeve is folded over a multiple number of packages of the pre-packaged "chaff." The panel section 84 forms the upper cover, the sections 86 the side covers, the panel section 84 being folded at the perforations 85 to form end covers, the extensions of the section 84 being folded under the chaff package. The panel section 88 is folded under the "chaff" package overlapping the extensions of section 84 folded thereunder. The extensions of sections 86 beyond the perforations are folded within the end sections formed by folded section 84. The panel section 89 is folded under the entire package with the strips 90 and 91 extending from the package.

In stacking the packages 92 so formed for dispensing, each succeeding package in a row is located with the projecting strips in the direction away from the dispenser outlet. Each succeeding package in a row overlaps the projection strips on the preceding package while the projecting strips on the rearmost package, provide the notches to receive the tubular ratchet rods. The use of these strips and the overlapping relationship of each succeeding package are extremely important since it permits the packaged articles to be smoothly ejected from the dispenser. If these strips were not present, the edges of the packaged articles as they were being ejected could catch in the spacing between the packaged articles in the row below, disrupting the orderly arrangement and jamming the dispenser.

In dispensing employing the novel dispensing apparatus, as the dog member 52 pushes out a package, the next succeeding package holds the sleeve on the preceding package causing the sleeve to unfold as the package is pushed into the ejection chute as shown in Fig. 12 and the pre-packaged "chaff" is released into the chute free to accomplish its purpose.

While a particular embodiment and application of the invention has been set forth herein, various modifications and applications thereof will be readily apparent to those versed in the art and such modifications and applications are considered to be within the scope of the invention.

The novel dispensing apparatus disclosed herein as is readily apparent presents an improved positive acting feed system employing a minimum of working parts resulting in economy of initial cost and maintenance. Moreover the compact nature of the dispenser feed unit presents a relatively increased capacity to a dispenser housing.

With reference to the novel "chaff" dispensing system resulting from the employment of the novel dispensing apparatus, there is further presented an improved packaging and dispensing arrangement to insure proper and positive dispersal of "chaff" from an aircraft. Many "chaff" dispensing systems have been employed previously but the novel apparatus of the invention is the first to provide a positive dispersal of "chaff" with the required degree of efficiency.

I claim:

1. A dispensing apparatus for vehicles subject to extreme acceleration and centrifugal forces comprising a housing adapted to receive layers of packaged articles in vertically stacked relation, a dispenser feed unit movably mounted in said housing for vertical movement, vertical guide means in said housing adjacent one open end thereof, and flexible guard means attached to said dispenser feed unit and riding in said vertical guide means for positioning and retaining the packaged articles in said housing, said flexible guard means comprising a plurality of parallel spacer bars movably mounted in said vertical guide means, a connecting plate on the forward end of said dispenser feed unit having a pair of depending spacer elements riding in said vertical guide means and spaced a predetermined distance from the uppermost of said plurality of spacer bars to provide a restricted article-ejection opening on the forward end of said housing, a chain member interconnecting each end of each of said plurality of spacer bars with each of said pair of depending spacer elements, and spring-biased cable means between said dispenser feed unit and the lowermost of said plurality of spacer bars, said spring-biased means positively urging said dispenser feed unit downwardly in continuous, resilient contact with the uppermost of said layers of packaged material, said plurality of spacer bars moving downwardly proportionally to said downward movement of said dispenser feed unit through the connection thereof with said spring biased cable means continuously providing an ejection opening in the forward end of said housing in correct alignment with successive layers of packaged articles being ejected by said dispenser feed unit.

2. A dispensing apparatus for vehicles subject to extreme acceleration and centrifugal forces comprising a housing adapted to receive layers of packaged articles to be dispensed and having bottom and side panels and an open, reinforced frame cover providing an opening at each end of said housing, a pair of tubular guides in one end of said bottom panel, a pair of parallel slotted tubular rods positioned in said tubular guides having ratchet teeth on one side thereof and extending upwardly through slots in said frame cover, parallel guide members adjacent to said slots and spaced from said frame cover to provide guide channels therewith, upstanding apertured lug members attached to said frame cover in alignment with the ways formed by said guide members, a rod extending at one end thereof through the apertures of each lug member and connected at the opposite end to an open-ended flanged cap member bearing in said guide channels, a coiled spring surrounding each of said last-named rods and abutting against each of said upstanding lug members resiliently biasing each of said cap members over the upper end of each of said pair of tubular ratchet rods to maintain said ratchet rods in vertical alignment with their ratchet teeth facing rearwardly, a dispenser feed unit comprising a pair of U-shaped side frames, a cover secured to the upper surfaces of said side frames, a pair of rotatably supported forward and rear rods transversely secured in each end of said side frames, a sprocket rotatably positioned on each end of each of said pair of rods, a driven sprocket positioned on said forward sprocket shaft intermediate of one of the sprockets on said forward shaft, a reinforcing rod secured to extensions on each side frame, a pair of spaced dog members positioned on said reinforcing rod in resilient engagement with the ratchet teeth of said pair of tubular rods and adapted for movement in one direction only to prevent upward movement of said dispenser feed unit, motor drive means mounted on said dispenser unit cover including a drive shaft and a drive sprocket, a first continuous sprocket chain between said drive sprocket and said driven sprocket, second and third sprocket chains between said respective forward shaft sprockets and said rear shaft sprockets driven by said motor-driven first continuous sprocket chain, a pair of diametrically opposed connecting rods and dog members affixed transversely of said second and third sprocket chains, and means operatively engaged with said dog members locking said dog members in substantially vertical depending position.

3. A dispensing apparatus for vehicles subject to extreme acceleration and centrifugal forces as in claim 2, and connecting means between said frame cover and said dispenser unit cover housing power lines to maintain a continuous power source between said motor drive means in any vertical position of said dispenser unit, said connecting means comprising a first bracket affixed to said frame cover, a second bracket affixed to said dispenser unit cover, and a jointed tubular member affixed therebetween.

4. A dispensing apparatus for vehicles subject to extreme acceleration and centrifugal forces as in claim 2, and means for holding a selected dog member of said dispenser feed unit in positive engagement with the top layer of packaged articles being dispensed, said means comprising a first rear bracket connected to said bottom panel, a second bracket connected to the forward surface of said bracket having a first pair of spaced aligned apertured lugs mounted thereon with a pulley wheel rotatably mounted in the aperture of each of said lugs, a pulley bracket mounted in the plane of said second bracket transversely of said bottom panel for sliding movement longitudinally thereof, a second pair of lugs with pulley wheels mounted thereon positioned on the rear surface and in the plane of said pulley bracket, said last-named pulley wheels being spaced outwardly of the first-named pulley wheels, a forward bracket mounted on said bottom panel, a coil tensioning spring between said pulley bracket and said forward bracket continuously urging said pulley bracket towards the forward end of said apparatus, a vertical pin mounted on said pulley bracket on the side opposite to its connection with said coil tensioning spring, a third and a fourth pulley bracket each having a pulley wheel mounted on said rear bracket, said third and fourth pulley wheels being mounted for rotation in a plane perpendicular to the plane of said first and second pair of pulley wheels outwardly therefrom, a plurality of interconnected spacer bars vertically positioned in the front end, dispensing side of said housing, a pair of parallel cables between the lowermost of said spacer bars and said vertical pin extending around said third and fourth pulley wheels, and then around said second and first pairs of pulley wheels, an interconnecting plate affixed to said dispenser feed unit, and a pair of interconnecting chains connecting opposite ends of said spacer bars to said interconnecting plate transmitting the continuous pressure of said coil spring to said dispenser unit.

(References on following page)

References Cited in the file of this patent

UNITED STATES PATENTS

| | | |
|---|---|---|
| 409,571 | Fischer | Aug. 20, 1889 |
| 1,550,803 | Harbison | Aug. 25, 1925 |
| 2,309,008 | Pease | Jan. 19, 1943 |
| 2,314,632 | Rear | Mar. 23, 1943 |
| 2,475,323 | James | July 5, 1949 |
| 2,527,685 | Roush | Oct. 31, 1950 |
| 2,578,545 | Haase | Dec. 11, 1951 |
| 2,601,072 | Van Schie | June 17, 1952 |
| 2,621,806 | Van Schie | Dec. 16, 1952 |
| 2,632,272 | Holek | Mar. 24, 1953 |
| 2,651,153 | Burnett | Sept. 8, 1953 |